Nov. 20, 1928.

H. HEITEL ET AL 1,692,300

VANITY CASE

Filed Oct. 16, 1922

INVENTORS
Harry Heitel
Joseph Heitel
BY
ATTORNEY

Patented Nov. 20, 1928.

1,692,300

UNITED STATES PATENT OFFICE.

HARRY HEITEL AND JOSEPH HEITEL, OF NEW YORK, N. Y., ASSIGNORS OF ONE-HALF TO HARRY JACOBSON, OF NEW YORK, N. Y.

VANITY CASE.

Application filed October 16, 1922. Serial No. 594,721.

This invention relates to vanity cases adapted to be carried about by the user, and has for one of its objects the provision of a thin "double compact" in which the usual accessories comprising rouge and powder cakes and puffs, and a mirror, are provided.

A further object of this invention is the provision of a simple structure for mounting a mirror in said vanity case, whereby a reflecting surface is presented to the user when the case is opened, regardless of the position in which the case is held.

Further results and objects contemplated by this invention are; the provision of means for removably carrying a mirror in said case; a mounting for a mirror whereby the mirror is independent of the case; the provision of a member insertable in the casing providing a compartment for holding the cake of rouge or powder in the case, while also supporting the mirror and holding a puff against displacement; and the provision of means on the cosmetic cake holding means for holding a puff in place in the case while permitting ready access to said puff and the removal thereof when desired.

Figure 1:
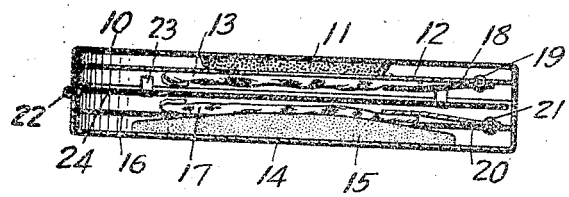
Figure 2:
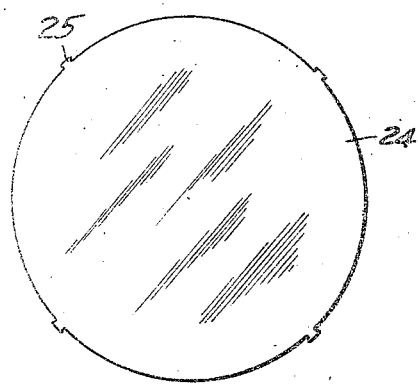
Figure 3:
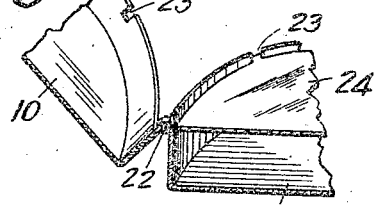
Figure 4:
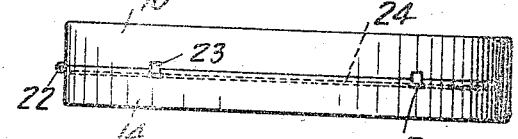
Figure 5:
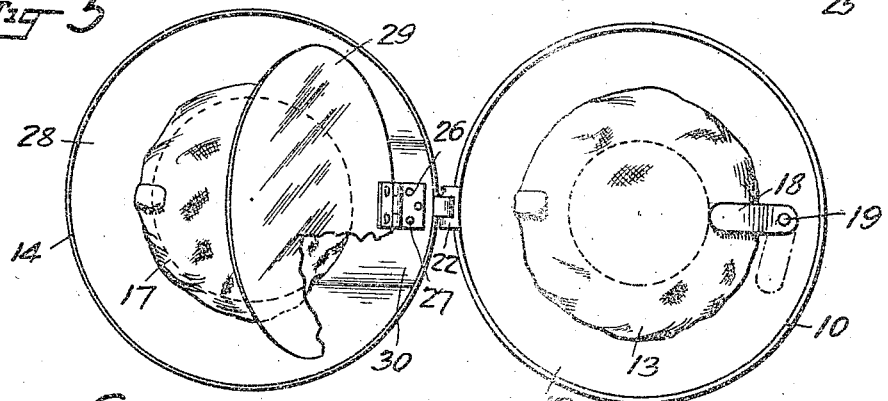
Figure 6:
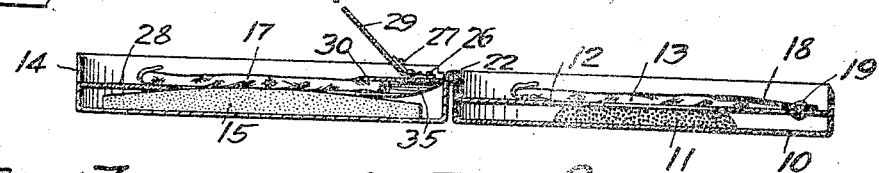
Figure 7:
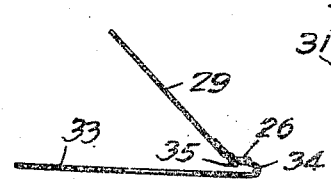
Figure 8:
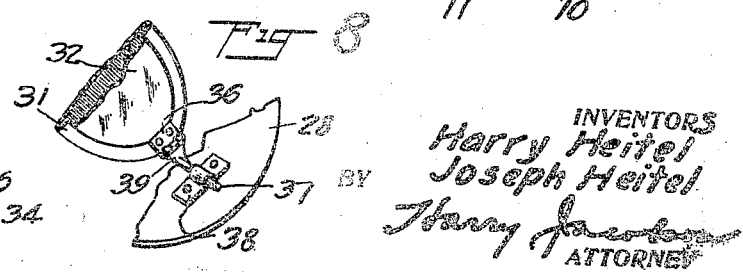

Still further objects of this invention will appear as the description progresses. In the illustrative embodiment of our invention shown in the accompanying drawing, Fig. 1 is a vertical section of one form of our invention. Fig. 2 is a top plan view of the mirror carried by the case. Fig. 3 is a perspective view and partial section of the invention showing a part of the case and of the mirror carried therein. Fig. 4 is an elevational view of the case. Fig. 5 is a top plan view of a modified form of our invention showing the mirror hinged to a bezel and swung to a partially upright position. Fig. 6 is a vertical section of that form of our invention shown in Fig. 5. Fig. 7 is a vertical section of a modified form of the bezel holding the mirror in place, and Fig. 8 is a perspective view of another form of mounting for the mirror.

The vanity case comprises two similar units or members 10 and 14, each made only sufficiently deep to allow the introduction therein of a compressed cake, a puff and a thin mirror, whereby a thin double compact embodying the desirable features of a single compact, is formed. Said units or members 10 and 14 are adapted to be closed one on the other in any suitable manner to form a closed, preferably cylindrical case, though the case may be of any shape desired. Both of the case members being substantially alike, it will be seen that the case is adapted to be opened with either one of the members 10 and 14 uppermost.

The member 10 is preferably provided with the rouge cake 11 and a rouge puff 13, a flat disc-like bezel 12 serving to hold said rouge cake in place. The other member 14 preferably contains the powder cake 15, a bezel as 16 for holding said cake in place and the powder puff 17. Each of said bezels 12 and 16 is formed preferably of a piece of sheet material with a central opening therein, the rouge or powder being accessible through said opening. The outer peripheral diameter of each bezel is made such that said bezel can be forced into the case, and tightly fits the walls, being in frictional engagement therewith, so that said bezel cannot ordinarily be displaced. Said bezels, however, may be readily pried out of the case when desired, as when it is desired to replace a used cake of rouge or powder, with a new one. It will be understood, however, that we do not intend to limit ourselves to a flat bezel, since the bezel may be otherwise shaped without departing from the spirit of this invention.

For holding the puffs in place, a clip as 18 may be pivotally secured to the bezel 12 as by means of a rivet 19, about which rivet the clip may be rotated. A similar clip 20 may be secured to the bezel 16, by means of the rivet 21 in the same manner, though it will be understood that the bezels themselves may be suitably shaped to receive and hold a puff, as will be more fully pointed out hereinafter.

The case members 10 and 14 are suitably hinged together as at 22, and each of said members has a number of slots as 23, preferably rectangular in outline, cut in the cylindrical walls thereof and near the peripheral edge. In the closed position of said case, the slots 23 in the member 10 are arranged directly above, and are preferably similar in all respects to, the corresponding slots in the other member 14 of the case.

In that form of our invention shown in Figs. 1 to 4 inclusive, the mirror 24 is preferably made of sheet metal polished on both sides to form reflecting surfaces. Said mirror is arranged for axial movement in said case, and is inserted into said case by first opening the case and then passing the projections 25 at the periphery of the mirror through the slots 23. Said projections are preferably made wider at the outer extremities than the remainder thereof to prevent undue movement or rattling of the mirror within the case. It will be seen that when the case is inverted, the mirror moves in said case guided by the sides of the slots 23 from one of the members 10 or 14 into the other, and that the lowermost member, whether that one happens to be the member 10 or 14, contains the mirror, while the cosmetic cake and puff carried in the uppermost compartment or member is readily accessible. If the user wishes to make use of the rouge compartment, the case is turned to bring the member 10 uppermost, whereby the mirror passes into the member 14. On opening the case, the articles in the member 11 are ready to hand, and the reflecting surface of the mirror is in the proper position for use with the rouge. Closing the case, inverting it, and then opening it, presents the powder and powder puff for use, with the mirror again automatically positioned for service.

In that form of our invention shown in Figs. 5 and 6, the mirror 29 is arranged so that it may be swung about the hinge 26 to uncover the powder puff 17 and the powder cake 15, when desired. Said mirror 29 is suitably secured, as by the rivets 27 to the hinge 26, the hinge being fastened to the raised portion 30 of the removable bezel 28. Said bezel is similar to the bezels 12 and 16, with the exception that a portion 30 is raised up higher than the remainder of said bezel 28, whereby the mirror 29 is held somewhat above the puff 17, and may be readily grasped at the rim thereof for manipulation. It will be seen by making a portion of the bezel higher than the remainder thereof or offset therefrom, a space as 35 is provided under said raised portion, in which space part of the puff 17 may be inserted for holding said puff in place.

Another form of said mirror-holding bezel is shown in Fig. 7, wherein a portion 34, projecting from the periphery of the bezel 33, is upturned to provide a raised portion on which the mirror 29 may be hinged. Enough space is provided underneath the portion 34 for the insertion of the powder puff, which may then rest under the mirror and on the bezel 33.

Where a glass mirror is preferred to a polished metal one, we provide the glass mirror 32 held in the frame 31. Means are provided for turning the mirror in any direction in the exercise of its reflecting function. Said means comprises the hinge 39, one section 36 of which is of the usual flat type and is attached to the frame 31, while the other section terminates in the pin 37. A suitable bearing 38, in which the pin 37 is revolubly mounted, is suitably secured to the removable bezel. It will be seen that by reason of the construction of the hinge 39, the effect of a universal joint is obtained and that the mirror may be swung into any desired position. It will also be seen that our invention provides a thin double compact easy to carry and to operate; that a reflecting surface is arranged within easy reach of the user on the opening of the case in any position of said case; and that any or all of the parts may be readily removed for replacement or repair.

We claim:

1. In a vanity case, a member fitted thereinto, a mirror, and a hinge directly joining peripheral points on the mirror and said member together.

2. In a vanity case, a pair of case members, a hinge joining said members, a substantially flat sheet metal member having an aperture therein fitted into a case member and maintained in place therein for forming a cosmetic cake compartment between the sheet metal member and the case member, whereby the outer face of the cake is accessible through said aperture, a mirror, and a hinge connecting the mirror to the sheet metal member and arranged to permit the mirror to lie upon and entirely outside of the sheet metal member.

3. A vanity case comprising a pair of substantially similar members each adapted to carry a cosmetic cake therein, and a bezel for holding a cake in place in one of said members comprising a substantially flat disc of slightly larger diameter than that of the inside of said case and having a central opening therein.

4. In a vanity case, a removable bezel for holding a cosmetic cake, and a clip pivotally secured to said bezel for holding a puff in place.

5. In a vanity case, a bezel for holding a cosmetic cake, an offset portion on said bezel adapted to have a puff inserted thereunder, and a mirror arranged in said case outwardly of said bezel and adapted to be moved in said case.

6. In a vanity case, a disc-like bezel adapted to engage the inside walls of said case frictionally for holding a cosmetic cake in place, means on said bezel for holding a puff in place, a movable mirror, and means for controlling the movement of said mirror.

7. In a vanity case, a bezel frictionally inserted into said case, a moveable mirror, and a hinge connecting said mirror to said bezel, and a pin terminal on said hinge rotatably mounted on said bezel.

8. In a vanity case, a pair of similar members, an apertured member insertable into one of said similar members in spaced relation to the bottom thereof providing a space for holding a cosmetic cake, a puff retainer on said apertured member and a mirror interposed between said similar members.

9. In a vanity case, a bezel adapted to engage the inside walls of said case frictionally for removably holding a cosmetic cake in place, an offset portion on said bezel adapted to have a puff inserted thereunder, a mirror, and hinge means for securing said mirror to said bezel.

10. In a vanity case, a pair of substantially similar members each adapted to carry a cosmetic cake therein, a removable bezel for holding said cake in place comprising a flat disc of slightly larger diameter than that of the inside of said case and having a central opening therein for exposing said cake, an offset portion struck from said bezel and adapted to have a puff inserted thereunder, and a mirror movably arranged between the bezels of each of said members.

11. In a vanity case, a removable disc-like bezel frictionally inserted into said case for holding a cosmetic cake in place, an offset portion struck from said bezel adapted to have a puff inserted thereunder, a mirror, and a hinge connecting said mirror and said bezel.

12. A vanity case comprising a pair of substantially similar members, a hinge joining said members, a removable disc-like bezel adapted to engage the inner walls of said case frictionally for holding a cosmetic cake in place in each of said members, means on said bezel for holding a puff in place, a double faced mirror, and means for adjusting the reflecting position of said mirror in said case.

13. In a vanity case, a substantially flat apertured member inserted thereinto in spaced relation to the ends of the case, and a mirror hingedly secured to the outer face of said member and adapted to lie upon said member and entirely outside thereof, and to cover the aperture of said member.

14. In a vanity case, a pair of hinged members, each adapted to hold a cosmetic cake and a puff, a member inserted into one of said hinged members, a mirror and a hinge connecting the mirror directly to said inserted member.

15. In a vanity case, a member fitted into said case forming a compartment for the reception of a cosmetic cake, a mirror and a hinge connecting the mirror directly to said member.

16. In a vanity case, a member having an aperture therein, fitted into said case for providing a cosmetic cake compartment, and means extending inwardly of the aperture for holding a puff in place.

17. In a vanity case, a pair of substantially similar case members hinged together and having upright walls, an apertured sheet metal member having a substantially flat annular portion between the aperture and the outermost peripheral edge thereof, said apertured member being inserted into one of the case members in spaced relation to the bottom thereof and forming a compartment for the reception of a cosmetic between the case member and the apertured member, a mirror, and means for hinging the mirror to the outer face of the apertured member and permitting movement of the mirror outside of the apertured member only.

HARRY HEITEL.
JOSEPH HEITEL.